United States Patent
Siebelts et al.

(10) Patent No.: US 11,692,529 B2
(45) Date of Patent: Jul. 4, 2023

(54) METHOD FOR MOUNTING ROTOR BLADES OF A WIND TURBINE

(71) Applicant: Wobben Properties GmbH, Aurich (DE)

(72) Inventors: Stephan Siebelts, Holtgast (DE); Dirk Ressel, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/063,164

(22) Filed: Oct. 5, 2020

(65) Prior Publication Data

US 2021/0102526 A1    Apr. 8, 2021

(30) Foreign Application Priority Data

Oct. 8, 2019 (DE) .......................... 102019126984.9

(51) Int. Cl.
*F03D 13/10* (2016.01)
*F03D 1/06* (2006.01)

(52) U.S. Cl.
CPC ............... *F03D 13/10* (2016.05); *F03D 1/06* (2013.01); *F05B 2230/61* (2013.01); *F05B 2240/21* (2013.01)

(58) Field of Classification Search
CPC ........ F03D 13/10; F03D 1/06; F05B 2230/61; F05B 2240/21
See application file for complete search history.

(56) References Cited

U.S. PATENT DOCUMENTS

| 7,165,941 | B2 | 1/2007 | Wobben |
| 7,353,603 | B2 | 4/2008 | Wobben |
| 2011/0185571 | A1 | 8/2011 | Maj et al. |
| 2020/0072187 | A1* | 3/2020 | Nies ...................... F03D 1/0658 |

FOREIGN PATENT DOCUMENTS

| DE | 20109835 | U1 | 1/2002 |
| DE | 102008033857 | A1 | 1/2010 |
| DE | 102015008610 | B3 | 12/2016 |
| EP | 1597477 | B1 | 4/2010 |
| WO | 03/012291 | A1 | 2/2003 |
| WO | 2014/076825 | A1 | 5/2014 |

\* cited by examiner

*Primary Examiner* — Nirvana Deonauth
(74) *Attorney, Agent, or Firm* — Seed Intellectual Property Law Group LLP

(57) ABSTRACT

A method for mounting rotor blades of a wind turbine is provided. The wind turbine has a rotor hub with three rotor blade ports. A rotor blade is to be mounted to each of the three rotor blade ports. A mounting arm is fastened to a first rotor blade port. The mounting arm has a first section and a second section, which are coupled with each other via a hinge, so that the angle between the first and second sections can be varied. The hub is turned until the first rotor blade port is in a 90° position. A first end of the first section of the mounting arm is fastened to the first rotor blade port of the rotor hub. The rotor hub is turned with the help of the mounting arm, until the second rotor blade port is in a 270° position. The angle between the first and second sections of the mounting arm is varied while turning the rotor hub. A first rotor blade is lifted, so that the first rotor blade is horizontally mounted to the second rotor blade port of the rotor hub.

11 Claims, 5 Drawing Sheets

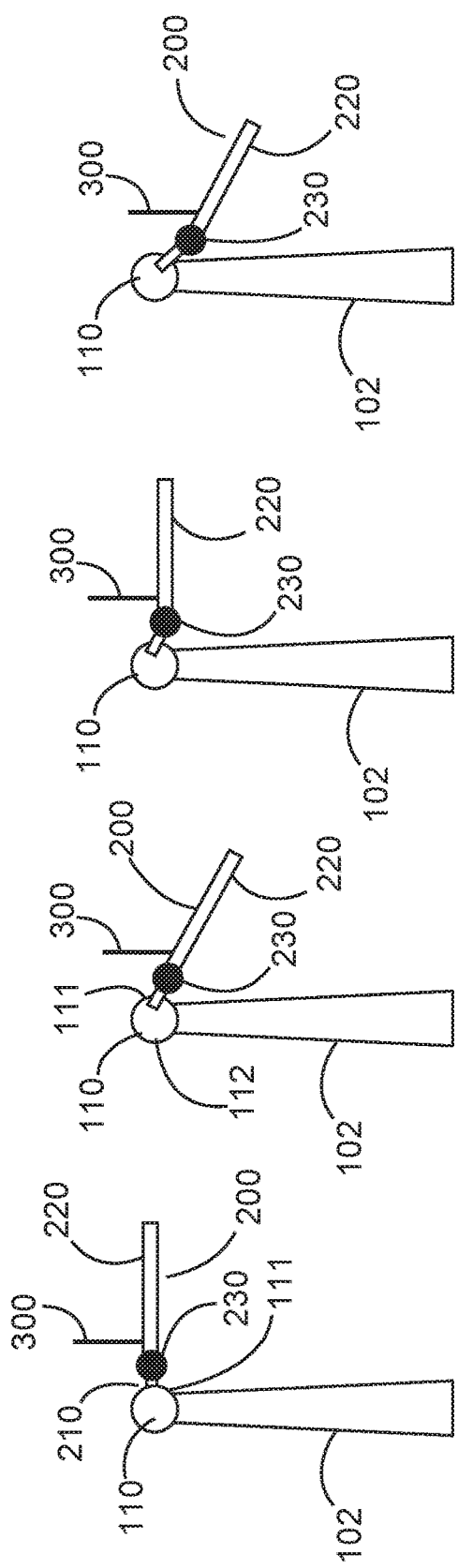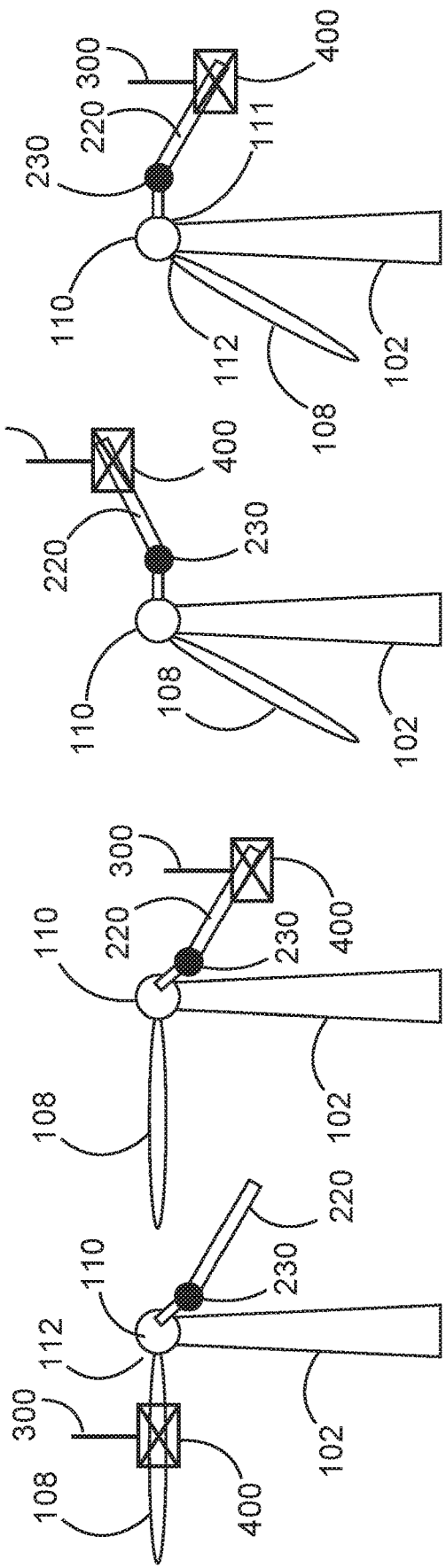

METHOD FOR MOUNTING ROTOR BLADES OF A WIND TURBINE

BACKGROUND

Technical Field

The present disclosure relates to a method for mounting rotor blades of a wind turbine and a mounting arm.

Description of the Related Art

During the construction of a wind turbine, it proves difficult to mount the rotor blades to a rotor hub of the wind turbine, in particular given unfavorable weather conditions (such as wind, rain, etc.). Therefore, efforts are being made to improve the mounting of rotor blades for a wind turbine.

WO 2003/012291 A1 relates to a method for mounting rotor blades to a rotor hub of a wind turbine. In order to avoid high torques in the mechanical linkage of the wind turbine while mounting the rotor blades, a counterweight is fastened to at least one flange of the rotor hub. The rotor hub is turned into a settable position, and the counterweight arranged on the flange of the rotor hub is replaced by a rotor blade by dismantling the counterweight and then fastening the rotor hub.

EP 1 597 477 B1 shows a method for mounting rotor blades to a rotor hub of a wind turbine. To this end, the rotor hub is turned into a specifiable first position (3 o'clock or 9 o'clock position), and a first rotor blade is fastened to the rotor hub. The rotor hub is then turned into a specifiable second position with the help of the first rotor blade assisted by the gravitational force of the rotor blade, so that the second rotor blade can be pulled up and fastened to the rotor hub in a 3 o'clock or 9 o'clock position. Before the second rotor blade is fastened to the hub, the nacelle is turned by 180 degrees. The rotor hub can be turned into another specifiable position with the help of the second rotor blade. The nacelle can in turn be turned by 180 degrees, and the rotor blade can be fastened.

In particular in large wind turbines with a high hub height and long rotor blades, it can happen that the available cranes are inadequate for fastening the rotor blades as before.

In the German patent application, which constitutes the priority for the present application, the German Patent and Trademark Office has identified the following documents: US 2011/0185571 A1, DE 10 2015 008 610 B3, DE 10 2008 033 857 A1 and DE 201 09 835 U1.

BRIEF SUMMARY

Embodiments provide for an effective mounting of rotor blades to a rotor hub of the wind turbine. In particular, one or more embodiments are directed to mounting of rotor blades to a rotor hub of the wind turbine that results in fewer steps.

In one embodiment, the rotor blades of the wind turbine are mounted using a mounting arm with a multistage design that allows at least two sections of the mounting arm to be turned or swiveled relative to each other. The mounting arm can have a first and second section, as well as a hinge between the first and second sections, so that the first and second sections are arranged so that they can swivel relative to each other. In order to mount the rotor blades, the mounting arm can be fastened to a first rotor blade port of the rotor hub. This can be done when the rotor blade port is in a 3 o'clock position (90°) or 9 o'clock position (270°).

The mounting arm is here preferably straight in design. The rotor hub can then be turned with the help of the mounting arm, for example by 30 degrees, so that a second rotor blade port is in the 9 o'clock or 3 o'clock position (270°, 90°), which enables an essentially horizontal mounting of the first rotor blade. After the rotor hub has been turned with the help of the mounting arm, the angle between the first and second sections of the mounting arm can be adjusted, thereby also changing the center of gravity of the mounting arm. For example, the first rotor blade can be fastened by means of a rotor blade traverse to the second rotor blade port, which is in the 3 o'clock or 9 o'clock position (90°, 270°). The mounting arm can then be lifted, for example with the help of the rotor blade traverse, so that the rotor hub rotates in such a way that a third rotor blade port is in the 9 o'clock or 3 o'clock position (270°, 90°), and a second rotor blade in turn can be mounted to the third rotor blade port by means of the rotor blade traverse, wherein the second rotor blade can be pulled up essentially horizontally by means of the rotor blade traverse.

The rotor hub can then be turned further, until the first rotor blade port is in the 3 o'clock or 9 o'clock position (90°, 270°). For example, this done with the help of the mounting arm and the rotor blade traverse, which is fastened to the mounting arm. The mounting arm can then be removed, and the third rotor blade can be mounted to the first rotor blade port.

Provided is a mounting arm, which is used while constructing a wind turbine, and in particular while mounting the rotor blades. The mounting arm has at least a first and second section, which are connected with each other by a pivot bearing, so that the first and second sections are designed so that they can be turned and swiveled relative to each other. A first end of the first section of the mounting arm is designed to be coupled to a rotor blade port of a rotor hub, and has a first fastening unit, for example. The second end of the first section of the mounting arm is coupled with the hinge.

In an aspect of the present disclosure, the length of the second section is larger than the length of the first section.

In another aspect of the present disclosure, the hinge or the pivot bearing allows at least two positions.

In another aspect of the present disclosure, the second section of the mounting arm has receiving links for receiving the rotor blade traverse.

In another aspect of the present disclosure, the first and/or second section of the mounting arm can be accessible from inside.

In another aspect of the present disclosure, the hinge of the mounting arm can be hydraulically or electrically adjusted.

In many embodiments, the assembly of a wind turbine is of a gearless wind turbine.

The rotor hub can be mounted with the help of the mounting arm. To this end, the mounting arm must be mounted to a rotor blade port, and the mounting arm together with the hub can then be pulled up by means of a crane rope, so that the hub can be mounted to the nacelle of the wind turbine. The multistage design of the mounting arm and the hinge of the mounting arm, which can have several positions, make it possible to mount the rotor blades of the wind turbine with fewer hoists of the crane. The mounting arm can be used to mount all three rotor blades in essentially a horizontal position.

Furthermore, no axial safety rope is required while mounting the rotor blades. While mounting the rotor blades, the mounting arm can be used to turn the hub based on its intrinsic weight and the torques.

BRIEF DESCRIPTION OF THE SEVERAL VIEWS OF THE DRAWINGS

Additional embodiments of the disclosure are the subject of the subclaims.

DETAILED DESCRIPTION

According to the disclosure, positions of the aerodynamic rotor 106 can be described based on a clock face or based on angle specifications. 0° here corresponds to a 12 o'clock position. 90° corresponds to a 3 o'clock position, 180° corresponds to a 6 o'clock position, and 270° corresponds to a 9 o'clock position.

Figure 1:
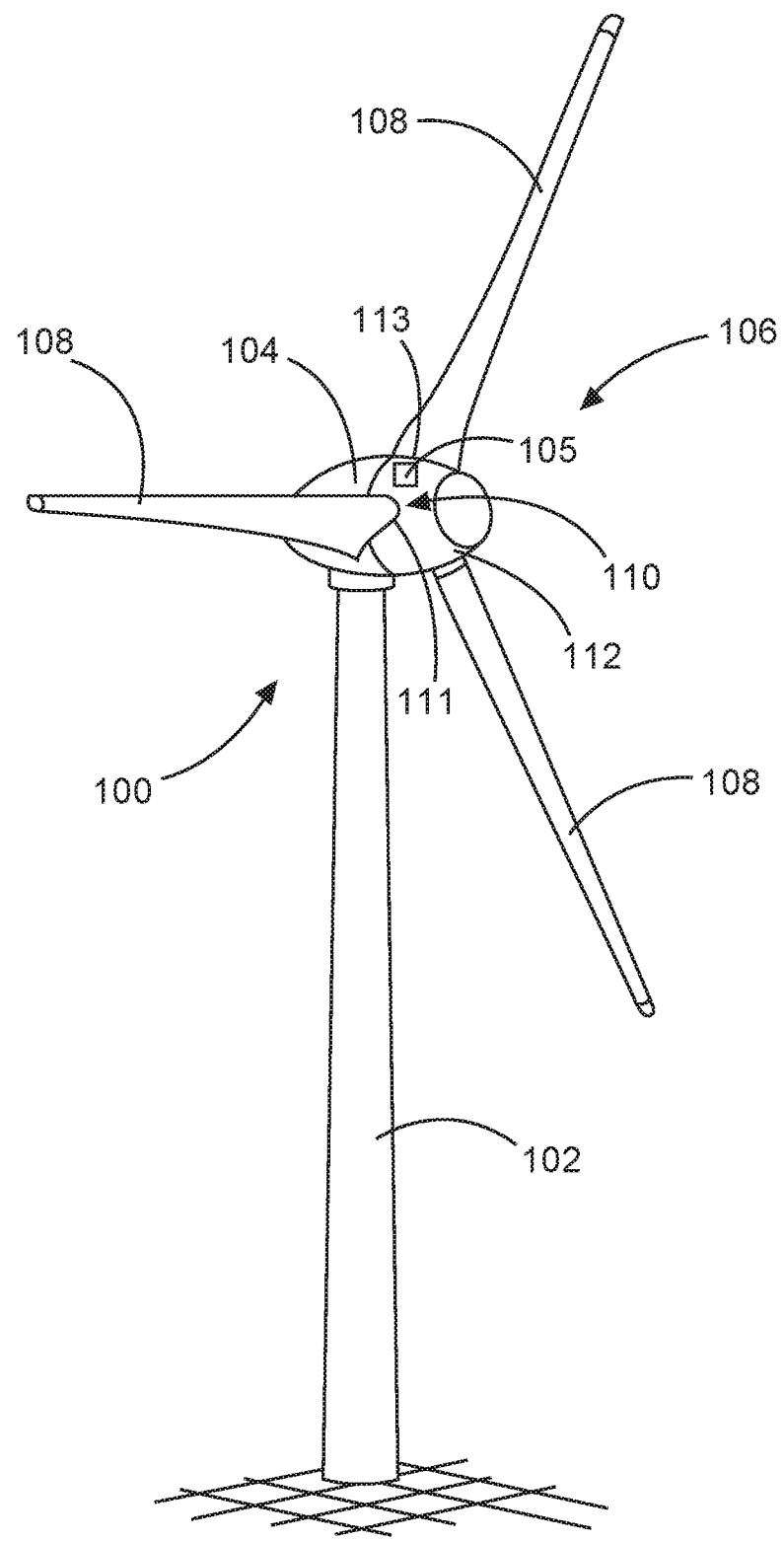
FIG. 1 shows a schematic illustration of a wind turbine according to the disclosure, FIG. 2A-2N each show different steps involved in mounting the rotor blades of the wind turbine on FIG. 1 according to a first exemplary embodiment, and FIG. 3A-3L each show a schematic illustration of a wind turbine while mounting rotor blades according to a second exemplary embodiment.

FIG. 1 shows a schematic illustration of a wind turbine according to the disclosure. Shown on FIG. 1 is a wind turbine 100 with a tower 102, a nacelle 104 and an aerodynamic rotor 106. The aerodynamic rotor 106 has a rotor hub 110 with three rotor blades 108. The rotor hub 110 has three rotor blade ports 111, 112, 113. The three rotor blades 108 are each mounted on the three rotor blade ports 111-113. The angle of attack or pitch angle of the three rotor blades 108 is preferably adjustable. To this end, a respective pitch motor can be provided in the area of the rotor blade port.

The wind turbine has an electrical generator 105. A rotor of the generator 105 is directly or indirectly coupled with the aerodynamic rotor 106, so that given a rotation by the aerodynamic rotor 106, the rotor of the generator 105 also rotates, and the generator 105 thereby generates electrical energy.

Figure 2J:
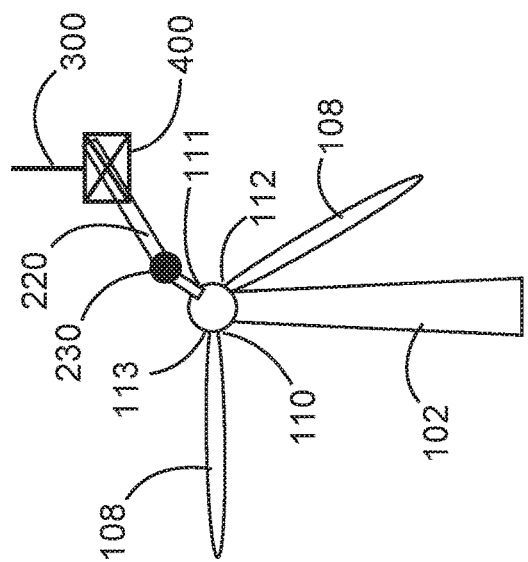
Figure 2K:
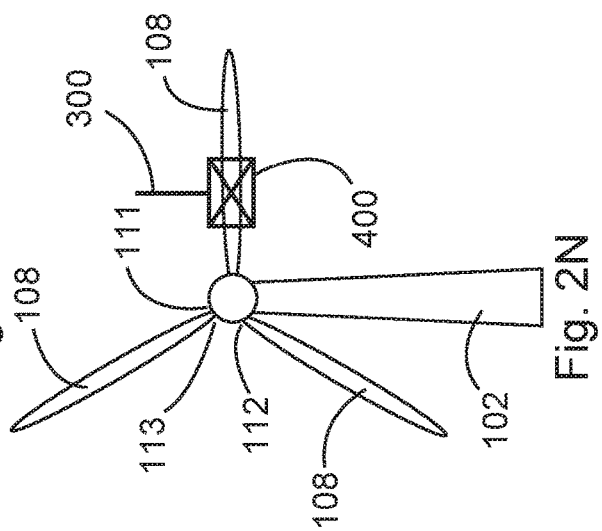
Figure 2L:
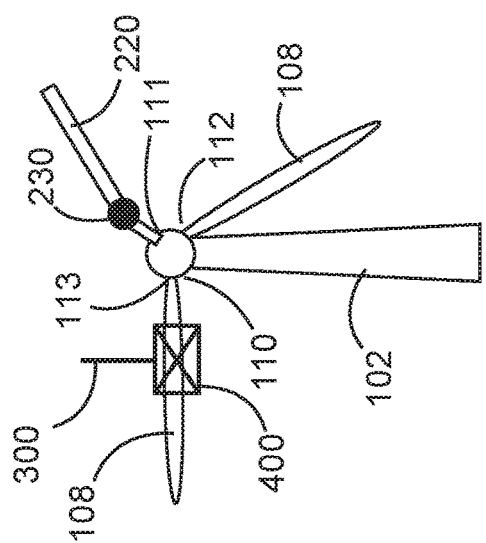
Figure 2M:
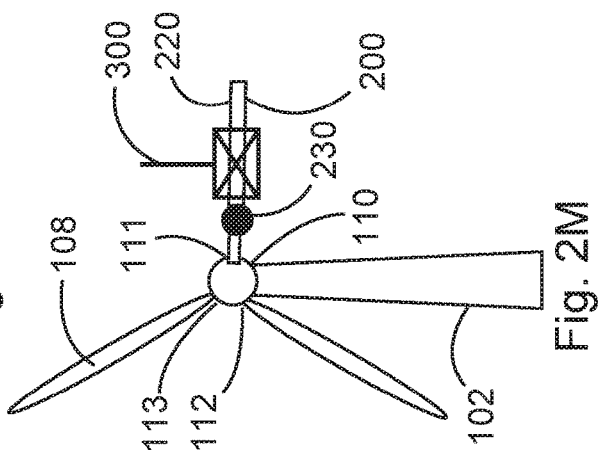
Figure 2N:
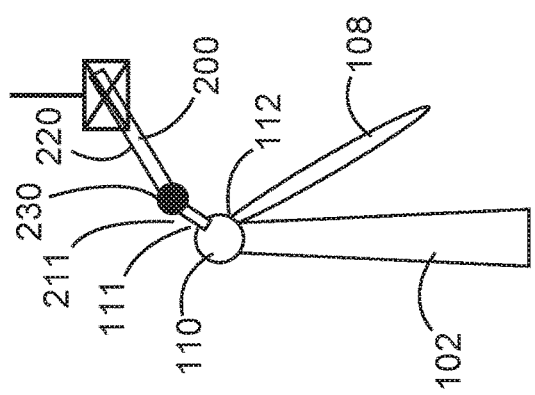
Figure 2N:
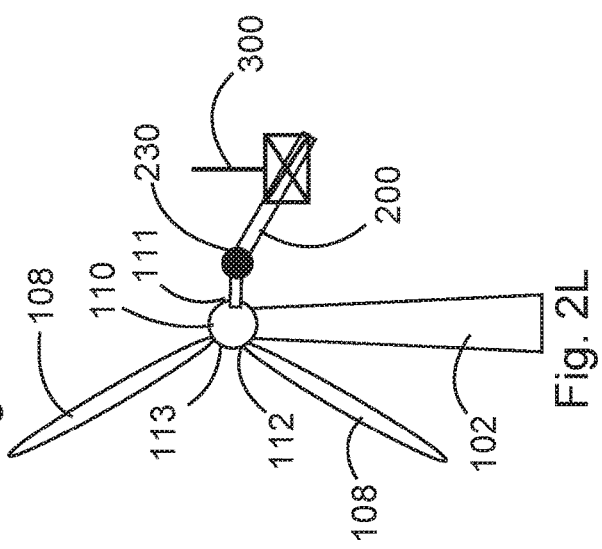
Figure 3C:
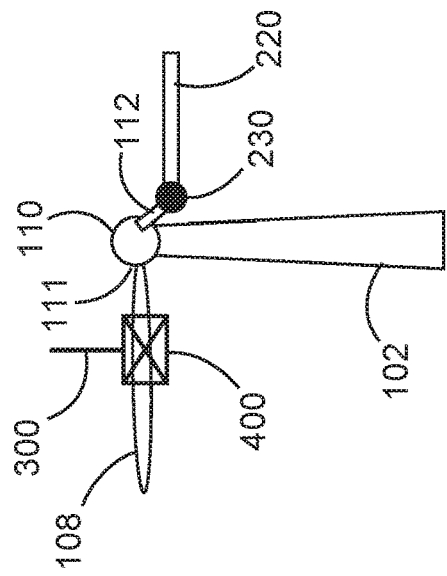
Figure 3F:
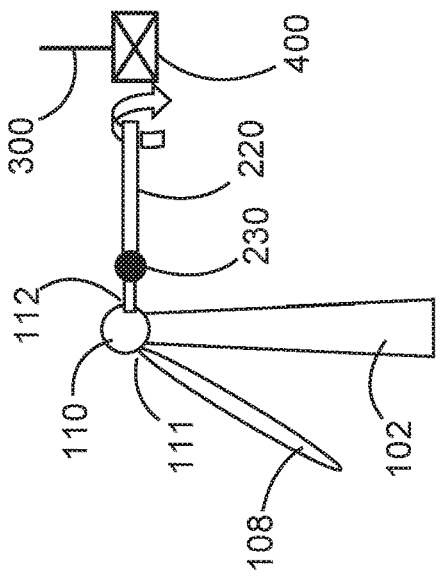
Figure 3B:
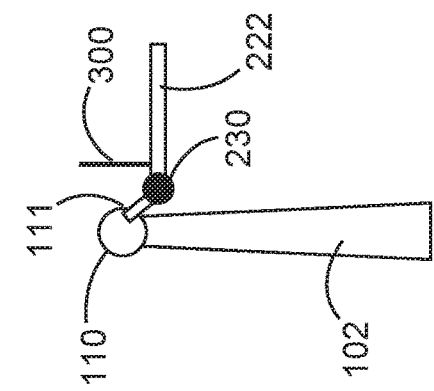
Figure 3E:
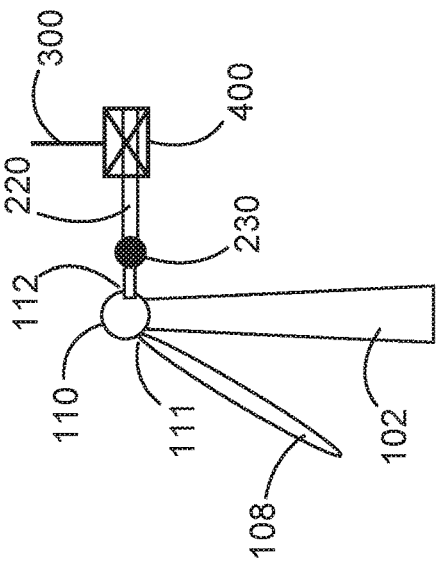
Figure 3A:
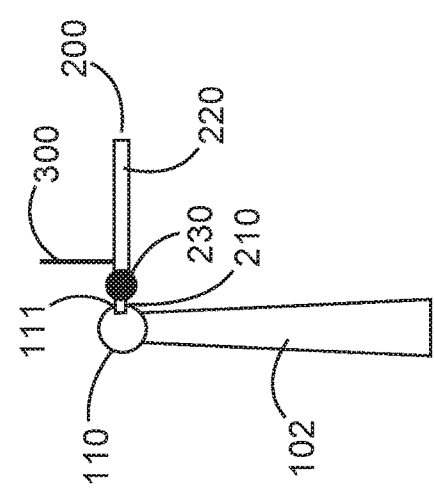
Figure 3D:
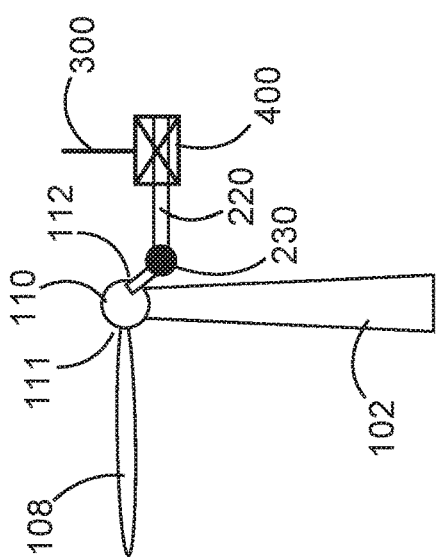
Figure 3I:
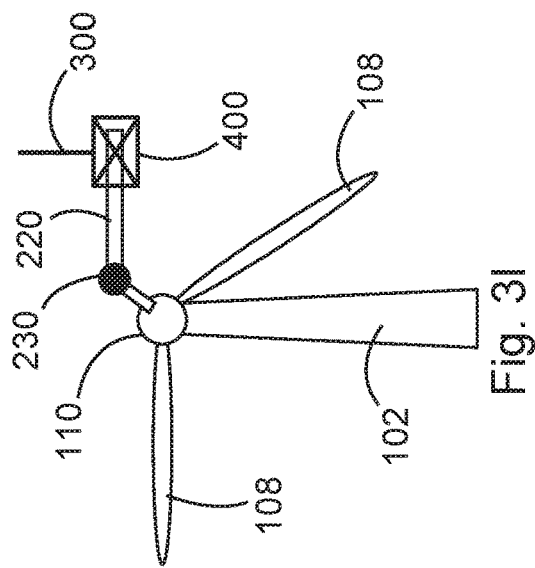
Figure 3L:
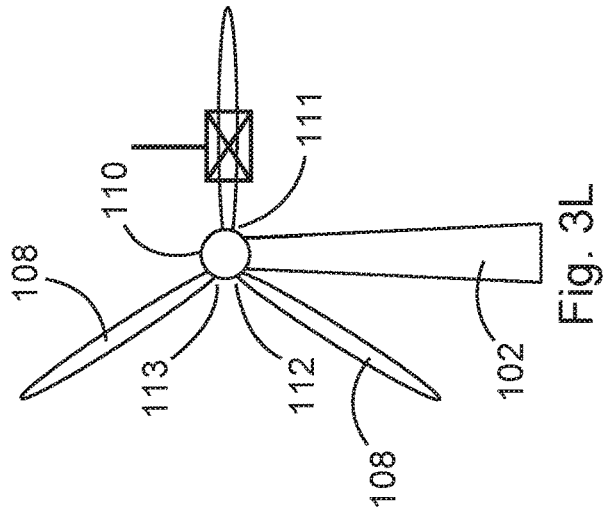
Figure 3H:
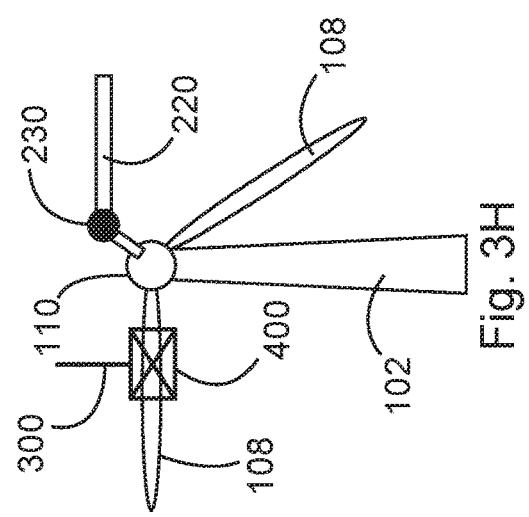
Figure 3K:
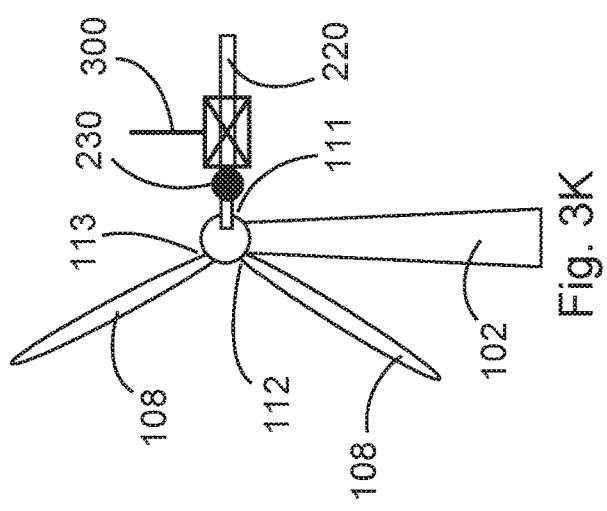
Figure 3G:
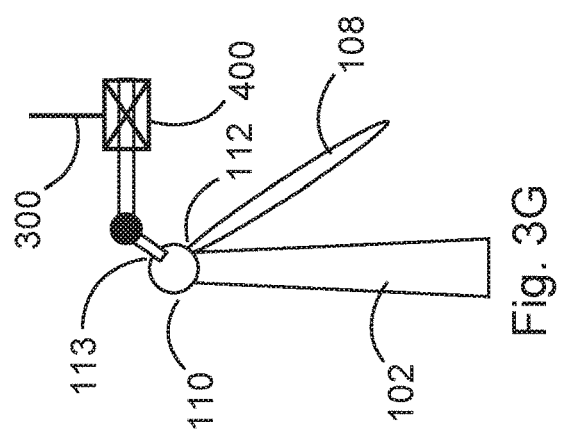
Figure 3J:
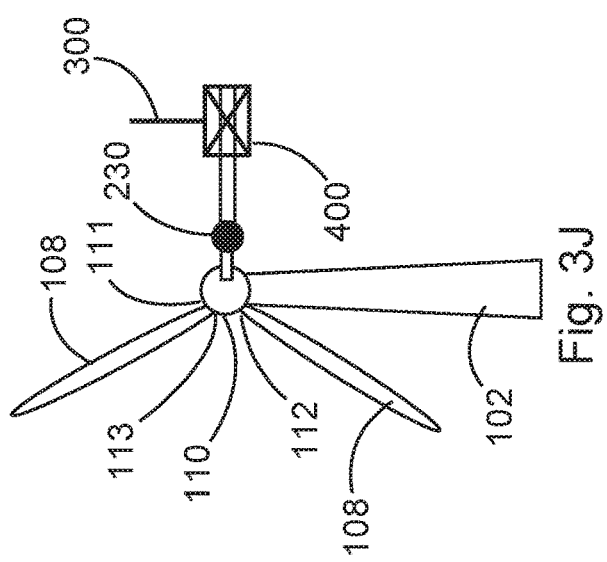

FIG. 2A-2N each show different steps in mounting the rotor blades of the wind turbine on FIG. 1 according to a first exemplary embodiment. FIG. 2A shows a first step S1 in mounting rotor blades of a wind turbine according to a first exemplary embodiment. A hub 110 of the wind turbine 100 has a mounting arm 200 on its first rotor blade port 111. The mounting arm 200 can be mounted on a first rotor blade port 111 of the rotor hub 110, while the hub 110 is on the floor. Alternatively, the mounting arm 200 can also be mounted once the hub 110 has already been mounted.

For this reason, the hub 110 can be optionally pulled up from the floor and mounted by means of the mounting arm 200. For example, this can be done by means of a crane rope 300.

The mounting arm 200 has at least a first and second section 210, 220, as well as a hinge 230 between the first and second sections 210, 220. The mounting arm 200 is fastened to a first rotor blade port 111, which optionally is in the 3 o'clock or 9 o'clock position (or 90° or 270°). In step S2 (FIG. 2B), the rotor hub 110 is turned by +/−30 degrees, for example, with the help of the mounting arm 200, so that a second rotor blade port 112 is essentially in the 9 o'clock or 3 o'clock position (or 270° or 90°).

The rotor hub 110 can be turned with the help of the mounting arm 200, and in particular the weight of the mounting arm 200. During the first and second steps S1, S2, the mounting arm 200 or the first and second sections 210, 220 are essentially aligned straight. The swivel hinge 230 is thus in a first position. In step S3 (FIG. 2C), the hinge 230 and the second section 220 are turned, so that the hinge 230 is in a second position. The second section 220 is here essentially horizontally arranged. The second section 220 can optionally be adjusted with the help of the crane rope 300.

In step S4 (FIG. 2D), the hub 110 is further turned by lowering the mounting arm 200, so that the second rotor blade port 112 is essentially in the 3 o'clock position.

In step S5 (FIG. 2E), a first rotor blade 108 is fastened to the second rotor blade port 112 by means of a rotor blade traverse 400 and the crane rope 300. The first rotor 108 is here pulled up essentially horizontally and fastened to the second rotor blade port 112 by means of the traverse 400. In step S6 (FIG. 2F), the rotor blade traverse 400 is fastened to the second section 220 of the mounting arm 200. In step S7 (FIG. 2G), the second section 220 of the mounting arm 200 is pulled up by 60 degrees, specifically by means of the rotor blade traverse 400 and the crane rope 300. In step S8 (FIG. 2H), the hinge 230 is released, and the second section 220 is lowered by 60 degrees by means of the traverse 400 and the crane rope 300.

In step S9 (FIG. 2I), the rotor hub 110 is turned by pulling up the mounting arm 200. The first rotor blade port 111 is here turned from the 3 o'clock position into a 1 o'clock position, so that the second rotor blade port 112 is in a 4 o'clock position, and the third rotor blade port 113 is in a 9 o'clock position. In step S10 (FIG. 2J), a second rotor blade 108 is mounted to the third rotor blade port 113 by means of the rotor blade traverse 400 and the crane rope 300. In step S11 (FIG. 2K), the rotor blade traverse 400 engages into or acts on the second section 220. In step S12 (FIG. 2L), the hub 110 is turned by means of the mounting arm 200, so that the first rotor blade port 111 is in the 3 o'clock position. In step S12 (FIG. 2M), the hinge 230 is released, and the second section 220 of the mounting arm 200 is pulled up by 30 degrees, so that the first and second sections 210, 220 are straight in design.

In step S14 (FIG. 2N), the mounting arm 200 is dismantled, and a third rotor blade 108 is mounted to the first rotor blade port 111 by means of the rotor blade traverse 400 and the crane rope 300, so that all three rotor blades 108 are mounted.

FIG. 3A-3L each show a schematic illustration of a wind turbine while mounting the rotor blades of the wind turbine according to a second exemplary embodiment. In step S101 (FIG. 3A), a mounting arm 200 is mounted to a first rotor blade port 111 of the hub 110 by means of a crane rope 300. The mounting arm 200 according to the second exemplary embodiment can correspond to the mounting arm 200 according to the first exemplary embodiment. The mounting arm 200 has at least one first and second section 210, 220, as well as a hinge 230 between the first and second sections 210, 220. The first section 210 has a first and second end 211, 212, wherein the first end 211 can be mounted to a rotor blade port, here the first rotor blade port 111. The second end 212 of the first section 210 is coupled to the hinge 230 or fastened thereto. The second section 220 has a first end 221, which is fastened to the hinge 230. The hinge 230 is lockable, and can enable several positions, so that the angle between the first and second sections 210, 220 can be adjusted. According to the second exemplary embodiment, the hinge 230 has a drive 231, by means of which an angle between the first and second sections 210, 220 can be set. The hinge 230 can optionally be designed to turn the second section 220 along its longitudinal axis. In step S102 (FIG. 3B), the angle between the first and second sections 210, 220 is adjusted in such a way that the second section 220 of the mounting arm 200 is essentially horizontal. Turning the hub 110 causes the second rotor blade port 112 to be in the 9 o'clock position. In step S103 (FIG. 3C), a first rotor blade 108 can be mounted to the second rotor blade port 112 by means of the rotor blade traverse 400 and the crane rope 300. In step S104 (FIG. 3D), the rotor blade traverse 400 is released from the mounted first rotor blade 108 and fastened to the second section 220 of the mounting arm 200. In step S105 (FIG. 3E), the mounting arm is aligned straight, and the rotor hub 110 is turned by 30 degrees. In step S106 (FIG. 3F), the rotor blade traverse 400 is released, and the mounting arm can be turned by 180 degrees by means of the pitch drive.

In step S107 (FIG. 3G), the angle between the first and second sections 210, 220 of the mounting arm 200 is turned, so that the first rotor blade port 111 is in a 1 o'clock position, and the second section 220 is essentially horizontal in design. In step 108 (FIG. 3H), a second rotor blade 108 is mounted in a 9 o'clock position by means of the rotor blade traverse 400 and the crane rope 300. In step S109 (FIG. 3I), the rotor blade traverse 400 is removed from the mounted second rotor blade 108, and fastened to the second section 220 of the mounting arm 200. In step S110 (FIG. 3J), the rotor hub 110 is turned by aligning the mounting arm 200 straight and lowering the rotor blade traverse 400 by 60° with the fastened second section 220 of the mounting arm 200. In step S111 (FIG. 3K), the mounting arm 200 is dismantled by means of the rotor blade traverse 400 and the crane rope 300, and a third rotor blade 108 can be mounted to the first rotor blade port 111 in step S112 by means of the rotor blade traverse 400 and the crane rope 300.

As a consequence, all three rotor blades 108 are mounted.

The mounting arm is multistage in design, and can consist of a steel structure. A first end of the first section of the mounting arm can be screwed to a rotor blade flange bearing of the hub. In the overall center of gravity with rotor hub screwed on, the mounting arm preferably has anchor points, which serve to mount the hub to the wind turbine. As a result, the rotor hub can be mounted by means of the mounting arm. A receiving link can be provided in the area of the second section of the mounting arm for connection with a rotor blade traverse. The multistage mounting arm can optionally be accessible from inside, making it possible to control the connection with the rotor blade traverse. The mounting arm and optionally the rotor blade traverse can have a weight, by means of which the rotor hub can be turned with the assistance of gravitational force.

The hinge in the mounting arm is used to reduce the lever arm and diminish the crane loads and required lifting height. The hinge can be locked into at least three positions.

The rotor blade traverse can have a tilt function, for example of +/−30 degrees. The tilt function of the traverse makes it possible to improve a mounting of the rotor blades, which is enabled on FIGS. 2F, 2G, 2H, 2I, 2K and 2L. The drivable hinge according to the second exemplary embodiment requires no rotor blade traverse with a tilt function, since this can be balanced out by the drivable hinge.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for mounting rotor blades of a wind turbine, wherein the wind turbine has a rotor hub having first, second, and third rotor blade ports, the method comprising:
   fastening a mounting arm to the first rotor blade port, wherein the mounting arm has a first section and a second section that are coupled to each other via a swivel hinge, wherein an angle between the first and second sections is variable by the swivel hinge;
   turning the rotor hub so that the first rotor blade port is in a 90° position or in a 270° position;
   while the first rotor blade port is in the 90° position or in the 270° position, fastening a first end of the first section of the mounting arm to the first rotor blade port of the rotor hub;
   turning the rotor hub with the help of the mounting arm so that the second rotor blade port is in a 270° position or in a 90° position, wherein the angle between the first and second sections of the mounting arm is varied while turning the rotor hub;
   lifting a first rotor blade so that the first rotor blade is horizontally mounted to the second rotor blade port of the rotor hub;
   turning the rotor hub with the help of the mounting arm so that the third rotor blade port is in a 270° position or in a 90° position;
   mounting a second rotor blade to the third rotor blade port;
   turning the rotor hub with the help of the mounting arm, until the first rotor blade port is in the 90° position or in the 270° position, wherein the angle between the first and second sections of the mounting arm is varied by the swivel hinge;
   removing the mounting arm from the first rotor blade port; and
   mounting a third rotor blade to the first rotor blade port.

2. The method according to claim 1, wherein the swivel hinge is configured to be turned and locked in at least three positions.

3. The method according to claim 1, wherein the swivel hinge is configured to be electrically or hydraulically driven, and wherein the swivel hinge is configured to be locked in at least three positions.

4. The method according to claim 1, wherein the mounting arm is varied twice after being fastened to the first rotor blade port and before mounting the first rotor blade to the second rotor blade port.

5. The method according to claim 1, wherein the angle between the first and second sections of the mounting arm is varied once.

6. The method according to claim 1, wherein the angle between the first and second sections of the mounting arm is varied at least once after mounting the second rotor blade to the third rotor blade port.

7. The method according to claim 1, wherein the angle between the first and second sections of the mounting arm is changed while turning the rotor hub.

8. The method according to claim 1, wherein lifting of the first, second, and third rotor blades comprises using a rotor blade traverse and a crane rope.

9. The method according to claim 1, wherein lifting the first rotor blade comprises horizontally lifting the first rotor blade.

10. The method according to claim 1, wherein a second end of the first section is fastened to the swivel hinge.

11. The method according to claim 1, wherein the first and second sections of the mounting arm have an interior.

\* \* \* \* \*